Aug. 22, 1961     W. R. HUGHES     2,997,234
DIGITAL MULTIPLIER
Filed Sept. 23, 1957
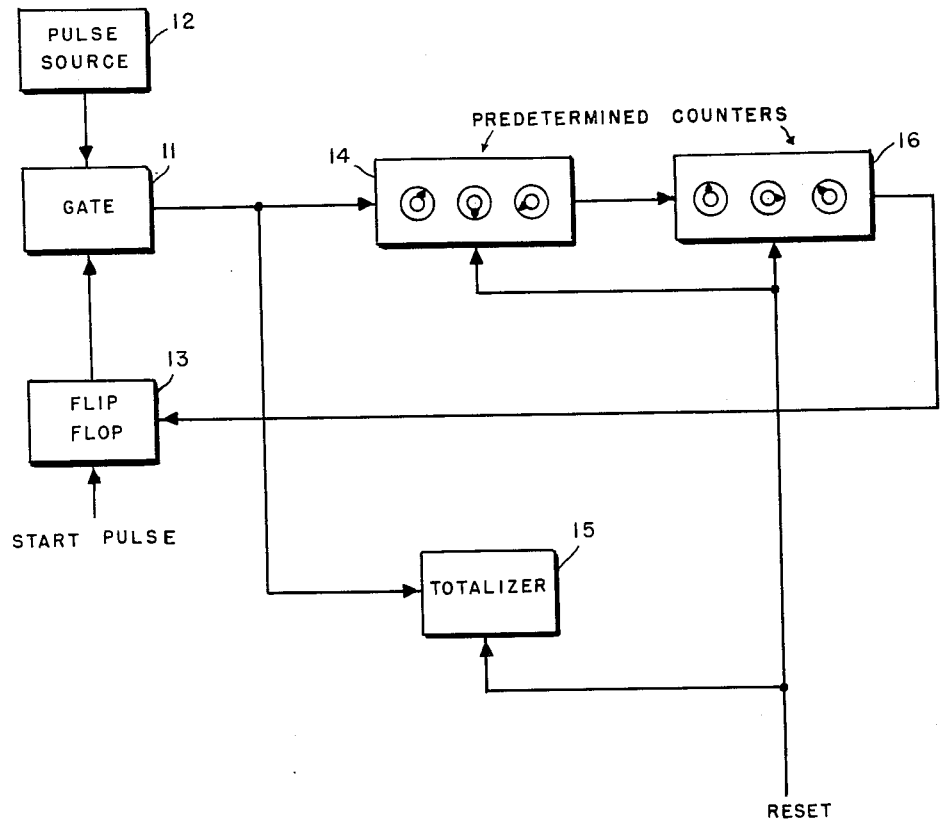
INVENTOR,
WILLIAM R HUGHES
BY
*Harry M. Saragovitz*
ATTORNEY.

United States Patent Office 2,997,234
Patented Aug. 22, 1961

2,997,234
DIGITAL MULTIPLIER
William R. Hughes, Sylmar, Calif., assignor to the United States of America as represented by the Secretary of the Army
Filed Sept. 23, 1957, Ser. No. 685,768
7 Claims. (Cl. 235—160)

The present invention relates to a digital multiplier. An object thereof is to provide a novel and simple means for multiplication by electronic techniques.

Briefly, the present invention comprises a pulse source connected to a pulse totalizer through a gate, means to open the gate to permit feeding of pulses from the pulse source to the totalizer, and a plurality of presettable predetermined counters connected in cascade to control the closing of the gate. The pulses being fed to the totalizer are simultaneously fed to the input of the first of the predetermined counters. The output from the last of the predetermined counters is fed to the gate. Thus, when the predetermined counters are respectively preset to the numbers that are to be multiplied, the gate will be closed after a total number of pulses equal to the product of the numbers have passed therethrough. Therefore the totalizer will indicate the product of the numbers by counting pulses passing through the gate.

The exact nature of this invention as well as other objects and advantages thereof will be readily apparent from the consideration of the following specification taken in connection with the annexed drawing which depicts in block diagram form a preferred embodiment of the invention.

Referring now to the drawing, there is shown a gate circuit 11 having applied thereto electrical information from both pulse source 12 and flip-flop circuit 13. The output pulses from gate circuit 11 are applied to first predetermined counter 14 and to totalizer 15 simultaneously. First predetermined counter 14 is further electrically connected to second predetermined counter 16, theoutput therefrom in turn being connected to flip-flop circuit 13. A manually controlled reset circuit is electrically connected to predetermined counters 14 and 16 and to totalizer 15. A reset pulse, applied to the reset, resets predetermined counters 14 and 16 and totalizer 15 to zero count condition.

A predetermined counter is essentially an adjustable frequency divider which can be preset to yield a single output pulse in response to any desired number of input pulses within the capacity of the counter. Examples of such counters are described in U.S. Patent 2,699,388, issued February 16, 1954 to B. Fox and in U.S. Patent 2,574,283, issued November 6, 1951 to J. T. Potter.

The multiplication system operates as follows: A pulse, applied to the reset, resets predetermined counters 14 and 16 and totalizer 15 to zero count condition. If it is desired to multiply a value X by a value Y, predetermined counters 14 and 16 are respectively preset to the multiplication factors X and Y.

A start pulse, applied to flip-flop circuit 13, opens gate circuit 11 and allows pulse source 12 to apply its output to predetermined counter 14. Since predetermined counter 14 behaves as a divider and is reset to multiplication factor X, the output therefrom will be a single pulse for every X pulses applied thereto. These output pulses are applied to predetermined counter 16 wherein the number of pulses are further divided by the preset multiplication factor Y and wherefrom a single pulse is derived for every Y pulses applied thereto. Thus when $X.Y$ pulses are applied to predetermined counter 14 a single pulse will be derived from predetermined counter 16.

Flip-flop circuit 13 is shut off (changes state) by a single output pulse being applied thereto from predetermined counter 16 thereby closing gate circuit 11 so that no more pulses will pass therethrough to predetermined counter 14 and to totalizer 15.

Since the pulses are applied simultaneously to predetermined counter 14 and to totalizer 15, totalizer 15 will count the pulses applied thereto and will indicate the total number of pulses that were allowed to pass through gate circuit 11 before this gate was closed. Therefore it can be seen that totalizer 15 will indicate the produce of X and Y.

For example, if it is desired to multiply 5 times 10, predetermined counters 14 and 16 and totalizer 15 will all first be rest to zero count condition by a rest pulse. Then predetermined counter 14 would be set to 5 so that every 5 pulses applied thereto would give a single pulse out, and predetermined counter 16 would be set to 10 so that every 10 pulse applied thereto would give a single pulse out. Thus when fifty pulses are applied to predetermined counter 14, the output from predetermined counter 16 will be a single pulse.

The single output pulse from predetermined counter 16 is fed to and shuts off flip-flop circuit 13 which in turn closes gate circuit 11 and allows no more than the fifty puses to be applied to totalizer 15; i.e., after the fiftieth pulse is applied to predetermined counter 14 gate 11 will no longer pass any more pulses from pulse source 12. These fifty pulses are also applied to totalizer 15 where the product of the multiplication will be indicated.

It should be understood that additional predetermined counters can be inserted in cascade between the gate 11 and circuit 13, i.e., any plurality of predetermined counters can be used when it is desirable to multiply a like plurality of numbers. Thus N predetermined counters will allow for the multiplication of N numbers. A switching network (not shown) can be used to switch in or out counter circuits so that the desired number can be used.

It should be noted that the invention does not depend upon the repetition rate of uniformity of the output of the pulse source. They will merely determine the speed of operation.

It should be understood that the foregoing disclosure relates to only a preferred embodiment of the invention and that numerous modifications or alterations may be made therein without departing from the spirit and the scope of the invention as set forth in the appended claims.

What is claimed is:

1. A system for multiplying a plurality of numbers comprising a source of pulses, a control means coupled to said source, a pulse totalizer coupled to the output of said control means for counting pulses received therefrom, said control means to stop the feeding of pulses from said source to said totalizer in response to the reception of a pulse, means comprising a plurality of presettable predetermined counters connected in cascade, the first of said counters connected to said output of said control means for receiving pulses therefrom, coupling means for feeding a pulse from the output of the last of said counters to said control means, said first of said counters and said totalizer receiving pulses simultaneously from said control means, whereby when said counters are respectively preset to said numbers said control means stops the application of pulses to said totalizer after a total number of pulses equal to the product of said numbers have passed from said source and said totalizer will indicate said product.

2. A system for multiplying a plurality of numbers comprising a source of pulses, a pulse totalizer coupled to said source through a gate, means to open said gate to permit feeding pulses from said source to said totalizer, and means to close said gate, the last named means comprising a plurality of presettable predetermined counters connected in cascade, means feeding pulses from the output of said gate to the input of the first of said counters and to said totalizer simultaneously, means feeding a gate closing pulse from the output of the last of said counters to said gate, whereby when said counters are respectively preset to said numbers said gate will be closed after a total number of pulses equal to the product of said numbers have passed through said gate and said totalizer will indicate said product.

3. A system as set forth in claim 2, wherein said means to open said gate and said means for feeding a gate closing pulse comprise a flip-flop circuit having two steady states respectively corresponding to gate opening and gate closing states, a circuit for setting said flip-flop circuit to said gate opening state, and a circuit energized by said gate closing pulse to set said flip-flop circuit to said gate closing state.

4. A system of digital multiplication comprising a gate circuit; a pulse source connected to said gate circuit for applying pulses thereto; a first predetermined counter connected to the output of said gate circuit to receive said pulses when said gate circuit is open; a second predetermined counter connected to the output of said first predetermined counter, said second predetermined counter having its output connected to said gate circuit; a totalizer connected to said output of said gate circuit to count the total number of pulses passing therethrough, said first counter and said totalizer receiving pulses simultaneously; reset means to reset said first and second predetermined counters and said totalizer to starting condition, said first and second predetermined counters each being set to a desired multiplication factor; means connected to said gate circuit for opening said gate circuit to allow pulses to pass therethrough, said gate circuit being closed and allowing no more pulses to pass therethrough when a single pulse appears at the output of said second predetermined counter and is applied to said gate circuit.

5. A system of digital multiplication comprising a gate circuit; a pulse source connected to said gate circuit for applying pulses thereto; a flip-flop circuit connected to said gate circuit for opening and closing said gate circuit; a means connected to said flip-flop circuit for applying a start pulse to said flip-flop circuit to open said gate circuit; a first presettable predetermined counter connected to the output of said gate circuit to receive said pulses when said gate circuit is open; said first predetermined counter being set to a first multiplication factor; a second presettable predetermined counter connected to the output of said first predetermined counter, said second predetermined counter being set to a second multiplication factor and having its output connected to said flip-flop circuit; a totalizer connected to said output of said gate circuit to count the total number of pulses passing therethrough, said first counter and said totalizer receiving pulses simultaneously; said flip-flop circuit changing state and closing said gate circuit when a single pulse is derived from said second predetermined counter and applied to said flip-flop circuit.

6. The system of digital multiplication of claim 5 further comprising a reset, said reset being connected to and being used to apply a reset pulse to reset zero count position said first and second predetermined counters and said totalizer before the multiplication is to begin.

7. A system of digital multiplication of a plurality of numbers comprising a gate circuit; a pulse source connected to said gate circuit for applying pulses thereto; a flip-flop circuit connected to said gate circuit for opening and closing said gate circuit; a means connected to said flip-flop circuit for applying a start pulse to said flip-flop circuit to open said gate circuit; a plurality of predetermined counters, each being presettable to one of said numbers, said counters being connected in cascade between the output of said gate circuit and said flip-flop circuit; said plurality of counters having applied at the input thereof said pulses from said pulse source when said gate circuit is opened, a totalizer connected to said output of said gate to count the total number of pulses passed thereby, said totalizer and said input of said counters receiving pulses simultaneously, said flip-flop circuit shutting off and closing said gate circuit when a single pulse is applied from said ouput of said plurality of counters to said flip-flop circuit.

References Cited in the file of this patent

UNITED STATES PATENTS

| | | |
|---|---|---|
| 2,403,873 | Mumma | July 9, 1946 |
| 2,558,447 | MacSorley | June 26, 1951 |
| 2,641,407 | Dickinson | June 9, 1953 |
| 2,725,191 | Ham | Nov. 29, 1955 |
| 2,824,698 | Van Nice et al. | Feb. 25, 1958 |
| 2,833,941 | Rosenberg et al. | May 6, 1958 |

OTHER REFERENCES

Wild: Predetermined Counters, Electronics (March 1947), pp. 120 to 123.

Meyer: An Operational-Digital Feed-back Divider, Transactions of the I.R.E. Professional Group on Electronic Computers (March 1954), pp. 17 to 20.

UNITED STATES PATENT OFFICE
CERTIFICATE OF CORRECTION

Patent No. 2,997,234            August 22, 1961

William R. Hughes

It is hereby certified that error appears in the above numbered patent requiring correction and that the said Letters Patent should read as corrected below.

Column 2, line 13, for "rest", each occurrence, read -- reset --; line 38, for "of", first occurrence, read -- or --.

Signed and sealed this 20th day of March 1962.

(SEAL)
Attest:

ERNEST W. SWIDER            DAVID L. LADD
Attesting Officer            Commissioner of Patents